United States Patent
Garnier et al.

(10) Patent No.: US 6,824,323 B2
(45) Date of Patent: Nov. 30, 2004

(54) CONNECTING BALL JOINT, FOR EXAMPLE FOR AN ANTI-ROLL BAR OF A RUNNING VEHICLE

(75) Inventors: Denis Garnier, Levallois Perret (FR); Laurent Beaubatie, Maisons Alfort (FR)

(73) Assignee: Hutchinson (FR)

( * ) Notice: Subject to any disclaimer, the term of this patent is extended or adjusted under 35 U.S.C. 154(b) by 0 days.

(21) Appl. No.: 10/768,411

(22) Filed: Jan. 29, 2004

(65) Prior Publication Data

US 2004/0184869 A1 Sep. 23, 2004

Related U.S. Application Data

(62) Division of application No. 09/981,037, filed on Oct. 17, 2001, now Pat. No. 6,726,394.

(30) Foreign Application Priority Data

Oct. 20, 2000 (FR) .............................................. 00 13456

(51) Int. Cl.[7] .............................................. F16C 11/06
(52) U.S. Cl. ........................ 403/135; 403/132; 403/133
(58) Field of Search ................................. 403/135, 132, 403/133, 137, 143, 141

(56) References Cited

U.S. PATENT DOCUMENTS

| 3,495,858 A | | 2/1970 | Kindel |
| 3,504,904 A | * | 4/1970 | Galbato et al. ......... 403/228 X |
| 4,034,996 A | * | 7/1977 | Manita et al. .......... 403/140 X |
| 5,031,545 A | | 7/1991 | Bourgeot |
| 5,033,722 A | | 7/1991 | Lammers |
| 5,150,657 A | | 9/1992 | Bourgeot |
| 5,286,132 A | * | 2/1994 | Morini ....................... 403/228 |
| 5,902,050 A | | 5/1999 | Balczun et al. |

FOREIGN PATENT DOCUMENTS

| DE | 3536284 | 4/1987 |
| DE | 3936775 | 11/1990 |
| EP | 0334081 | 9/1989 |
| EP | 0461492 | 12/1991 |
| FR | 2562967 | 10/1985 |

* cited by examiner

Primary Examiner—John Cottingham
(74) Attorney, Agent, or Firm—Michael Best & Friedrich LLP

(57) ABSTRACT

The invention relates to a connecting ball joint (10), for example an anti-roll bar of a running vehicle, said ball joint (10) comprising a straight support (20) running along a general axis of elongation (xx') and an elastically deformable member (30) mounted around this support (20). This ball joint has the characteristic that its elastically deformable member (30) comprises at least one laminated structure (35; 135) made up of (a) layer(s) (32) of elastically deformable flexible material and of (a) layer(s) (34) of more rigid material.

2 Claims, 6 Drawing Sheets

CONNECTING BALL JOINT, FOR EXAMPLE FOR AN ANTI-ROLL BAR OF A RUNNING VEHICLE

RELATED APPLICATIONS

This application is a division of prior, U.S. patent application Ser. No. 09/981,037, filed Oct. 17, 2001, now U.S. Pat. No. 6,726,394 which claims the benefit of French Patent Application Serial No. 0013456, filed Oct. 20, 2000.

BACKGROUND

The invention relates to a connecting ball joint particularly for an anti-roll bar of a running vehicle, and especially for a bogie and/or body of a high speed train.

In the particular, but nonlimiting, field of anti-roll bars (also known as stabilizing bars or anti-sway bars) commonly used in automotive or rail suspension systems, the function of such a bar is to oppose the vertical forces transmitted to the wheels in bends when the inertia of the vehicle causes the latter to roll transversely.

The means of connecting or of fixing an anti-roll bar to the chassis of the vehicle or to the suspension arms may be varied and, in particular, may comprise bearings or ball joints provided, for example, with an elastic bushing. Such bearings or ball joints have various functions, aside that of fixing the bar to the chassis, such as the function of filtering the forces, during roll, between the structure of the vehicle and said bar, or the function of filtering low-amplitude vibration.

Various types of ball joint exist which allow a certain rotational deflection between two rigid parts. For example, the ball joint may be fitted with a fairly thick rubber or polycarbonate bushing with a frictional connection. It is also possible to anticipate the use of lubricated ball joints.

SUMMARY OF THE INVENTION

However, such ball joints are not yet satisfactory because they do not correctly filter vibration, and this leads to unpleasant noise due, for example, to the excessive stiffness of the parts which prevent, or following degradation of the parts which causes play and rattle. They are also not very strong. Finally, they do not have good ratios between angular excursion and stiffness (radial, rotational and conical torsional stiffnesses)

The object of the invention is therefore to solve at least some of these problems.

To do that, the invention relates to a connecting ball joint, for example an anti-roll bar of a running vehicle, said ball joint comprising a straight support running along a general axis of elongation and an elastically deformable member mounted around this support, characterized in that the elastically deformable member comprises at least one laminated structure made up of (a) layer(s) of elastically deformable flexible material and of (a) layer(s) of more rigid material.

In general, the elastically deformable member will comprise means for preloading its laminated structure, particularly for preventing the elastically deformable layer from working in tension.

According to one embodiment, the elastically deformable member may comprise two coaxial annular laminated structures and two annular sleeve tubes each mounted around one laminated structure to preload their elastically deformable layers once these sleeve tubes have been connected together using fixing means, the ball joint then having a plane of section roughly perpendicular to the axis of the support.

In particular, the two sleeve tubes will each have a contact surface perpendicular to the axis of the support and will be welded peripherally at these surfaces.

According to another embodiment, the elastically deformable member may have a plane of section passing through the axis of the support and may comprise two approximately hemispherical laminated structures extending along the axis xx' and two half sleeve tubes, also approximately hemispherical, each surrounding a laminated structure to preload their elastically deformable layers.

In particular, an outer tube may be crimped around the half sleeve tubes.

In order to allow good angular excursion of the ball joint, while at the same time avoiding have to resort to a lubricant, each laminated structure will consist of an alternation of approximately hemispherical layers of elastically deformable (hyperelastic) flexible material and of approximately hemispherical layers (or cups) of a more rigid material. The good shear properties of rubber are therefore put to full use in order to improve this ability to rotate. Indeed this material has a relatively low shear modulus (of the order of 0.5 to 2 MPa) for a high compression modulus (of the order of 1100 MPa).

Advantageously, each laminated structure will have a hyperelastic flexible layer at each of its ends, one in contact with a spherical core, and the other in contact with the preloading means.

By way of example, the hyperelastic flexible material may be a natural rubber and the rigid material may be a metal, and the layers of flexible material and the layers of rigid material may each have a thickness of the order of 1 mm.

In general, the ball joint also has a radial stiffness higher than the ball joints of the prior art, for equivalent bulk and equivalent possible excursion, and in particular have a radial stiffness which is higher than its torsional and/or torsional conical stiffness.

In addition, the elastically deformable flexible layers are connected to the more rigid layers in such a way that these flexible layers, when subjected to rotational forces about the axis of the support or forces of conical rotation about any axis perpendicular to the axis of the support, experience mainly shear forces, with no slipping with respect to the more rigid layers. Of course, these hyperelastic layers are subjected to radial compressive (and tensile) stresses.

The invention also relates to an anti-roll bar for a running vehicle such as a high speed train, equipped with a connecting ball joint as described hereinabove.

Other features, details and advantages of the invention will become apparent on reading the description which follows, given by way of example with reference to the appended drawings, in which:

DETAILED DESCRIPTION

Figure 1:
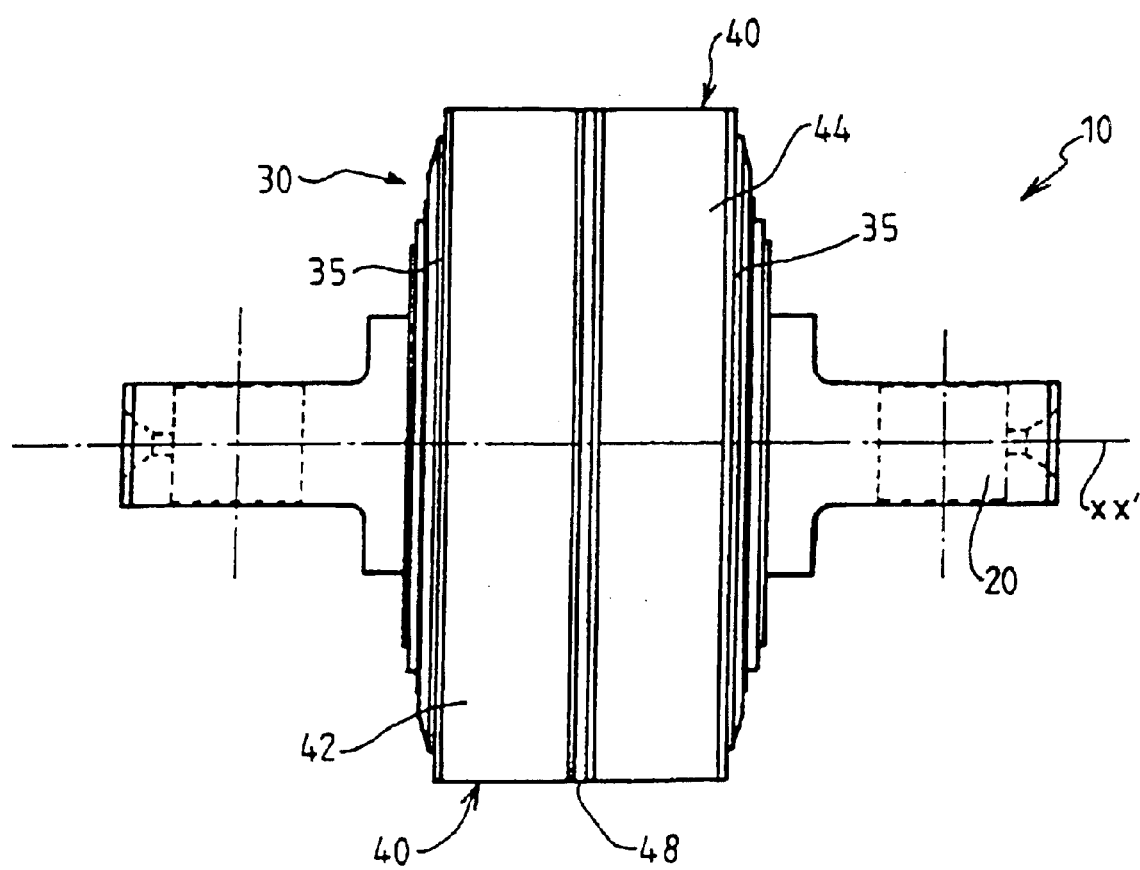
FIG. 1 is a front view of the ball joint according to the invention.

FIG. 1 depicts a laminated ball joint 10, for example for anti-roll bar (not depicted) of a high speed train. This ball joint 10 comprises a straight support 20 extending along a main axis of elongation xx' and an elastically deformable member 30 intended in particular to react the axial and radial forces while at the same time allowing significant rotational deflection.

The elastically deformable member 30 comprises at least one laminated structure 35 surrounded by a preloading means 40. A detailed description of this elastically deformable member 30 is given later on, in conjunction with FIGS. 3 and 4 in particular.

Figure 2:
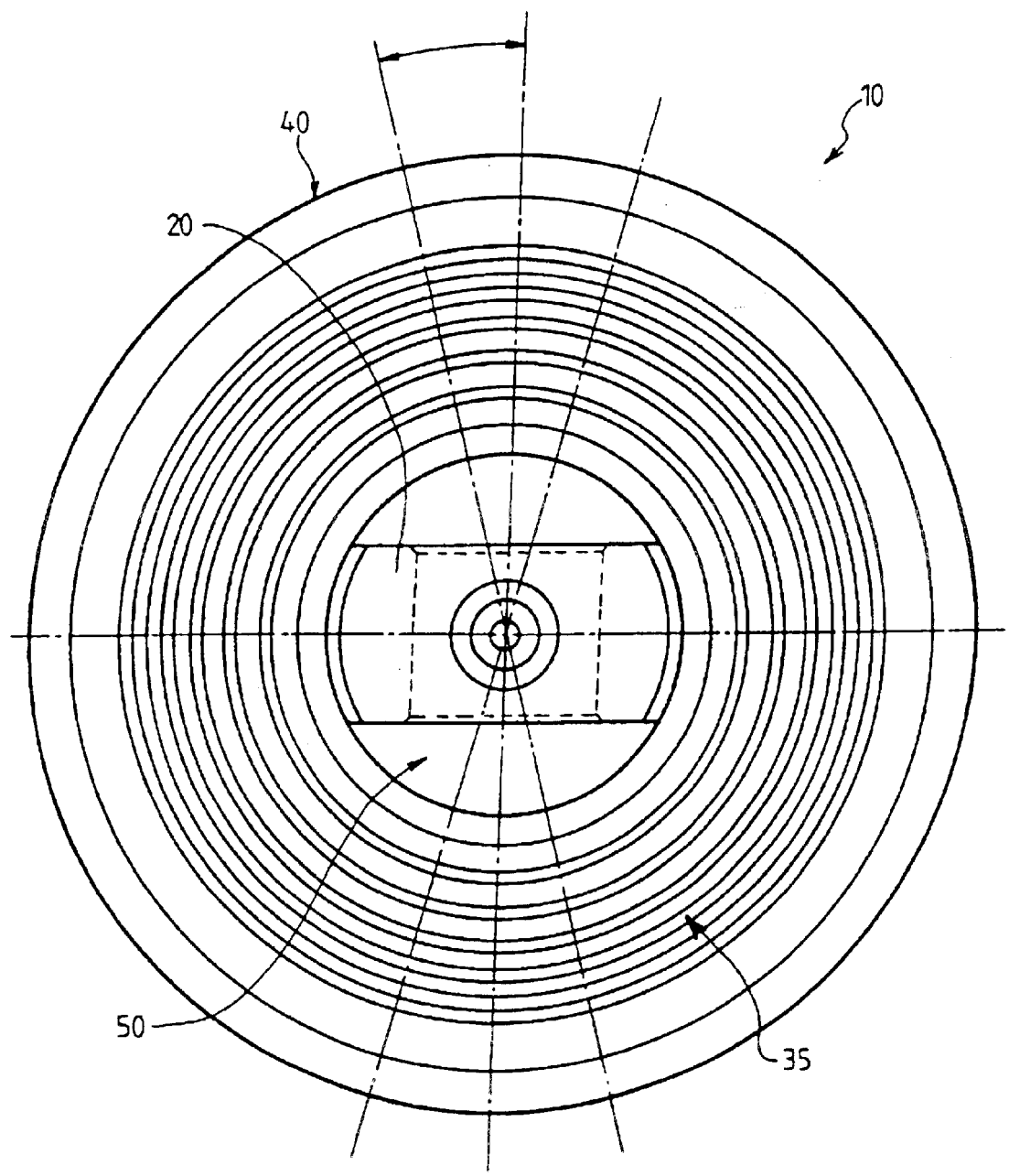
FIG. 2 is a side view of FIG. 1.

As can be seen in FIG. 2, the preloading means 40 and the laminated structure 35 are concentric, the laminated structure 35 being formed, as will be seen later on, of a (approximately radial) stack of layers 32 and 34 made of materials with different hardnesses.

Figure 3:
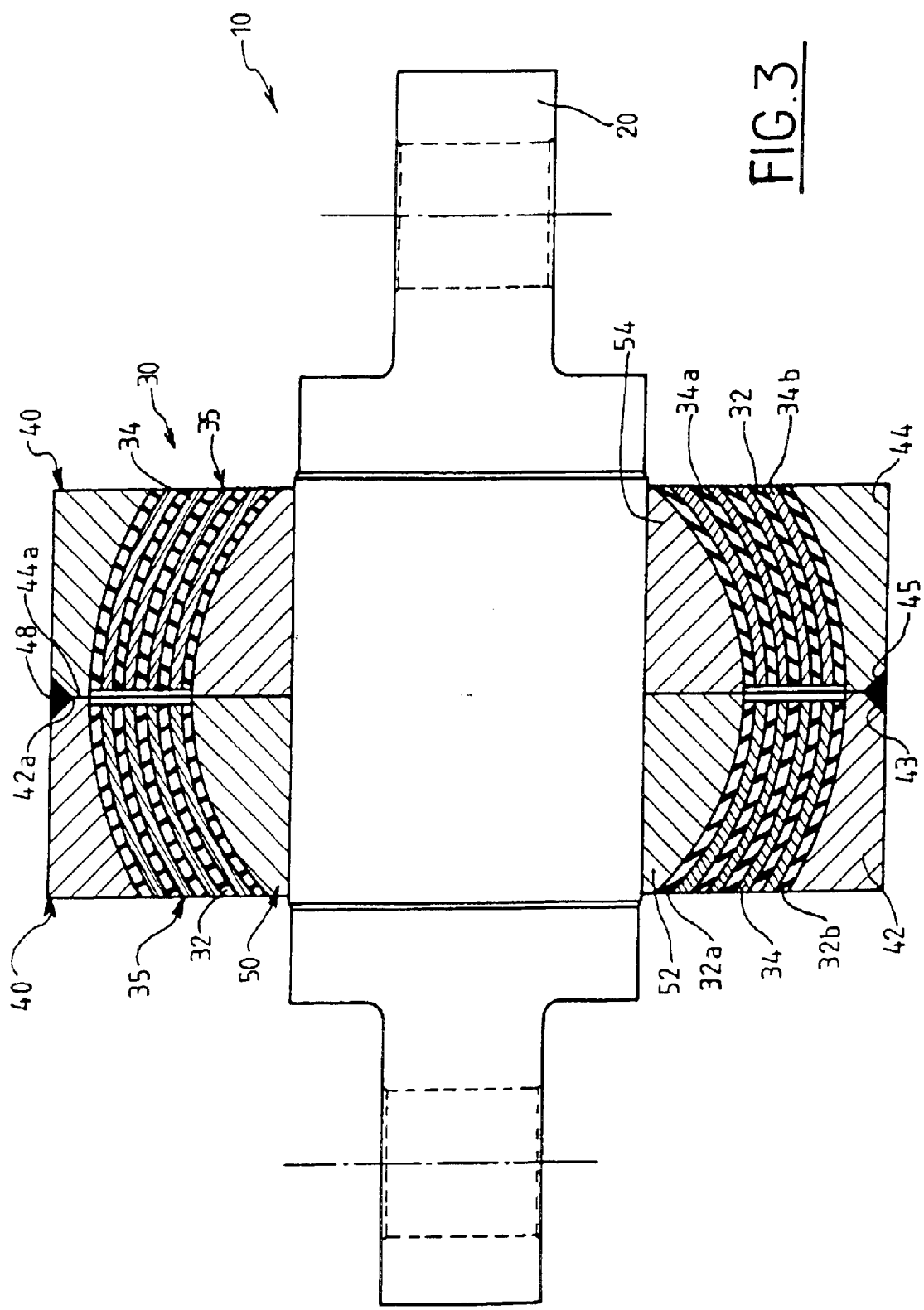
FIG. 3 is a sectional view of FIG. 1.
Figure 4:
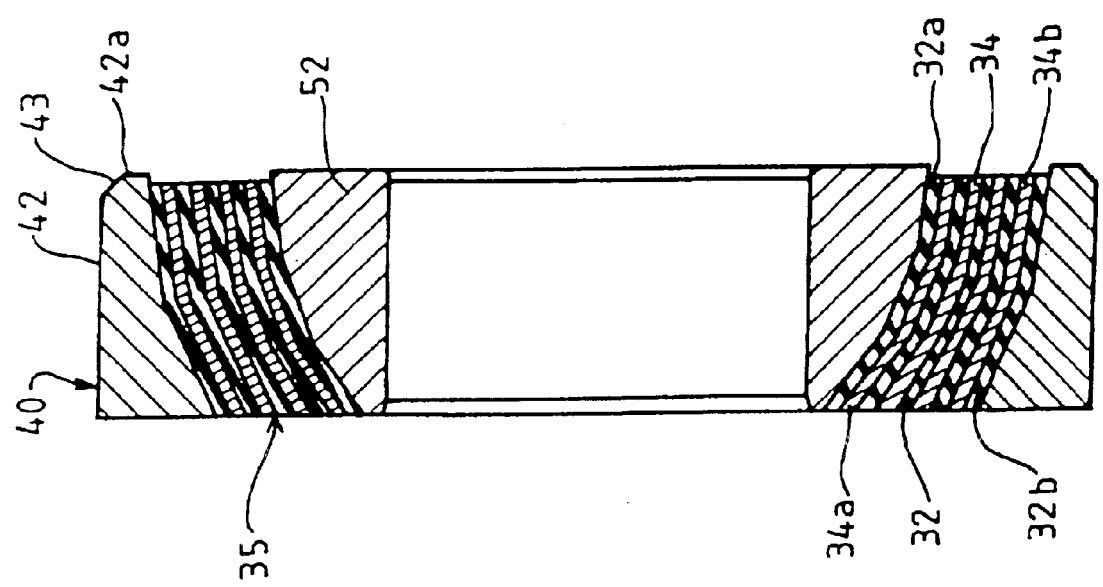
FIG. 4 is a detail view of FIG. 3.

FIGS. 3 and 4 show in greater detail the layers 32 and 34 of each laminated structure 35. As can be seen in particular in FIG. 3, the elastically deformable member 30 in fact comprises two laminated structures 35 which are annular and coaxial and which meet at a joining plane perpendicular to the axis xx' of the support 20. They need to be mounted on the support in such a way that their respective geometric centers are roughly coincident. In practice, this center is located approximately at the intersection of the axis xx' and of the joining plane of the two laminated structures 35, which, when the ball joint is pivoted (conical stressing) allows the layers to work in a shear.

The laminated structures are surrounded by sleeve tubes 42 and 44 respectively, for example made of steel and acting, once fixed to one another, as a means for preloading (particularly for axially preloading) the laminated structures 35.

Each laminated structure 35 thus consists of an alternating stack of layers 32 of an elastically deformable flexible material such as natural rubber and of layers, or cups, 34, made of a more rigid material, such as metal (building steel in particular).

An elastically deformable flexible material is to be understood as meaning a material deemed to be hyperelastic, that is to say one which has the ability to be deformed elastically in at least one most encouraged direction to a large extent, by contrast with a rigid material which has a small zone of elastic deformation.

In addition, each laminated structure 35 begins and ends the stack with a layer 32a/32b of flexible material. Thus, one layer 32a is in contact with one of the sleeve tubes 42 or 44, the other layer 32b is in contact with a core 50 of spherical shape belonging to the elastically deformable member 30 and possibly also secured to the support 20. Adhesion between the rubber layers 32 and the metal parts (core 50, preloading means 40, cups 34) is achieved when the part is molded by injecting rubber between the cups, through a chemical reaction. This embodiment gives far better performance than bonding or any other means of connection.

Of course, each laminated structure 35 has an approximately hemispherical interior and exterior shape, which means that it perfectly follows the external shape of the spherical core 50 and the internal shape of the sleeve tubes 42 and 44.

As can be seen in detail in FIG. 4, the thickness of each layer is relatively small, for example of the order of 1 mm in this instance. The dimensions depend on the use to which this ball joint is to be put, and are therefore given only by way of indication. It is, however, important that the metal cups 34 have sufficient strength at the time of molding that they do not deform under the pressure of the rubber.

Likewise, if the layers 32 of rubber are too thin, the material will have difficulty in flowing uniformly between the cups 34 during injection, and there will then be a risk of creating empty pockets in the stack.

This ball joint 10 is particularly simple to produce and to assemble.

First of all, a first laminated structure 35 is produced, trapping, during a first phase of injection-molding under pressure, rubber between the various cups 34 and between a first cup 34a and a half core 52, and between a last cup 34b a sleeve tube 42. A unit assembly approximately in the shape of a ring or half ball joint is thus created. As the metal cups 34 have a hemispherical shape, as does the internal surface of the sleeve tube 42 and the external surface of the half core 52, the layers 32/32a/34a of rubber also have a hemispherical shape.

The molding operation is repeated to form a second unit assembly (half ball joint) that complements the first, with a second sleeve tube 44, a second laminated structure 35 and a second core 54.

These two half ball joints are then mounted around the support 20 so as to form the ball joint 10.

To do that, the two half cores 52 and 54 and the sleeve tubes 42 and 44 and the laminated structures 35 are brought axially closer together so that the half cores touch to adopt a spherical shape. At that moment, the two sleeve tubes 42 and 44 are not yet in contact. The inside diameter of the core and the outside diameter of the support are chosen in such a way as to avoid any axial or torsional slipping of one half core with respect to the other when the ball joint is in use.

The sleeve tubes 42 and 44 are then forcibly brought closer together so that they too come into contact with one another at contact surfaces 42a and 44a which extend along a plane of section perpendicular to the axis xx' of the support 20. It is contrived that, when the half cores 52 and 54 are butted against each other, the sleeve tubes cannot come into contact with one another unless a certain axial force is exerted. In other words, there is a certain axial clearance between the two sleeve tubes before they are fixed together.

Next, the sleeve tubes 42 and 44 are held one against the other and are connected, for example by a welding technique (preferably laser spot welding) or by any other appropriate means which in particular is able to react the axial forces generated by the preloading.

While the weld 48 is being formed, care is taken to prevent the rubber layers 32b from being damaged by the heat released. This is made easier in particular by spot welding and by a suitable design of the rubber layers avoiding situating them too close to the welding zone.

Once the circumference of the sleeve tubes has been welded, it is possible to anticipate carrying out an additional machining operation on the part in order to remove any excess weld material.

It will be noted that both the sleeve tubes 42/44 and the rings 32/34 are identical and arranged symmetrically on each side of a plane perpendicular to the axis xx', so as to form a ball joint 10 which is well balanced (give or take the manufacturing tolerances) about this plane of section.

Bringing the sleeve tubes closer together along the axis xx' of the support, and fixing the sleeve tubes together by welding so as to fill the clearance left between them, have the effect of creating axial preload in the laminated structures by shear and compression of the rubber layers 32. This preload is particularly useful and in particular makes it possible to limit the work that the rubber does in tension, which allows for a longer life.

All that then remains is for the ball joint 10 thus produced to be fixed to an anti-roll bar (or to a damping arm) or to a connecting link for a bogie or body of a high speed train.

In general, this type of laminated ball joint has an elastic return force or moment in all directions, that is to say that applying a force in one direction causes a more or less proportional displacement in that direction and that applying a conical torsion angle (about any axis perpendicular to the axis xx') causes the appearance of a moment, this also being more or less proportional.

There is also a total absence of slippage of the elements one against the other, unlike in current ball joints, because the rubber layers in fact experience shear in all possible directions of rotation.

The production of this laminated ball joint makes it possible to get as close as possible to the model of the theoretical ball joint (three degrees of freedom in rotation, no degrees of freedom in translation) by virtue of higher stiffnesses in translation (axial and radial) and lower stiffnesses in rotation (torsional and conical torsional) than with conventional (unlaminated) rubber-metal ball joints and thus make it possible, for the same volume, to have higher forces arid deflections than in the prior art.

Figure 5:
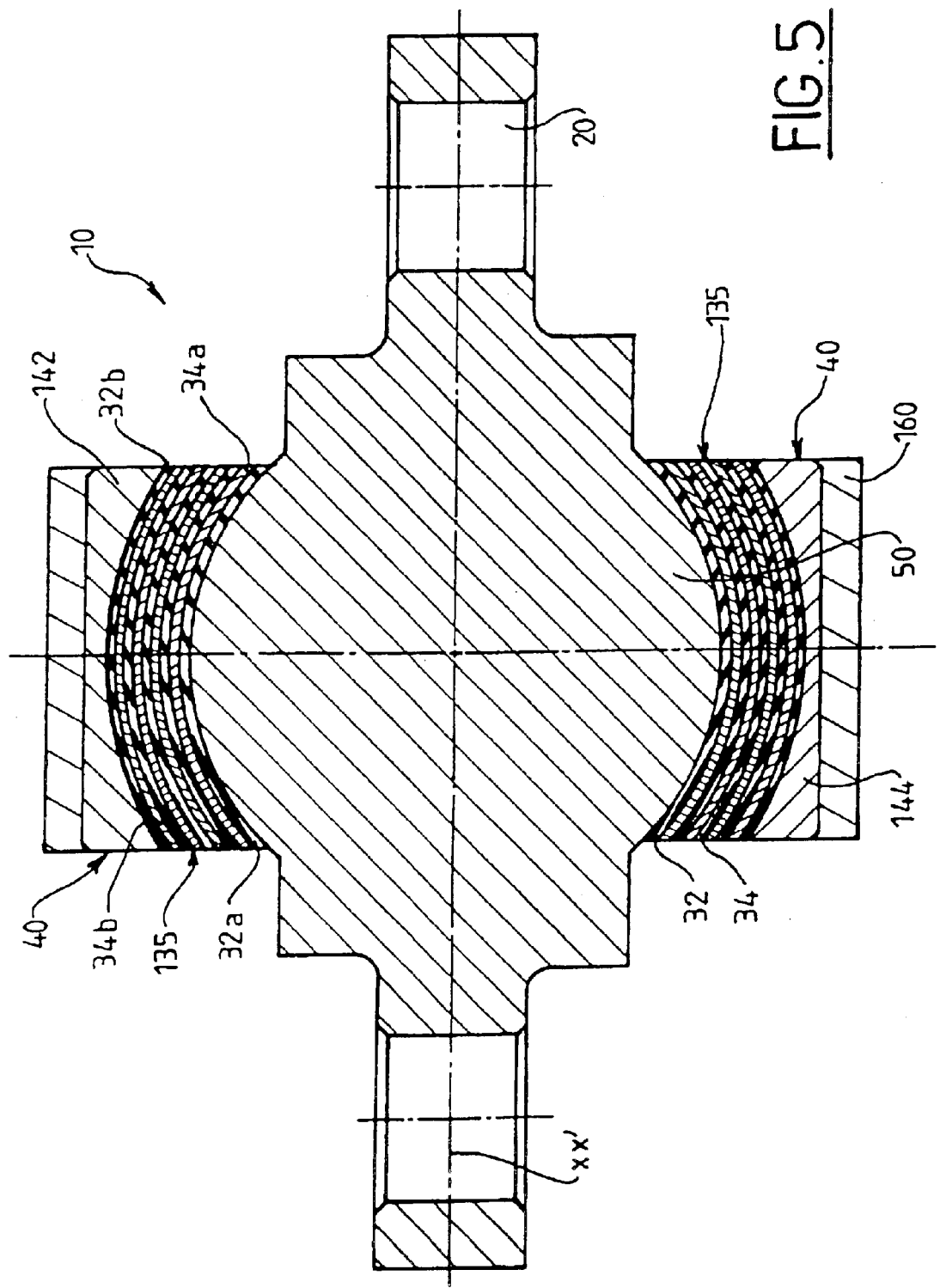
FIG. 5 is an alternative form of embodiment of FIG. 3.
Figure 6:
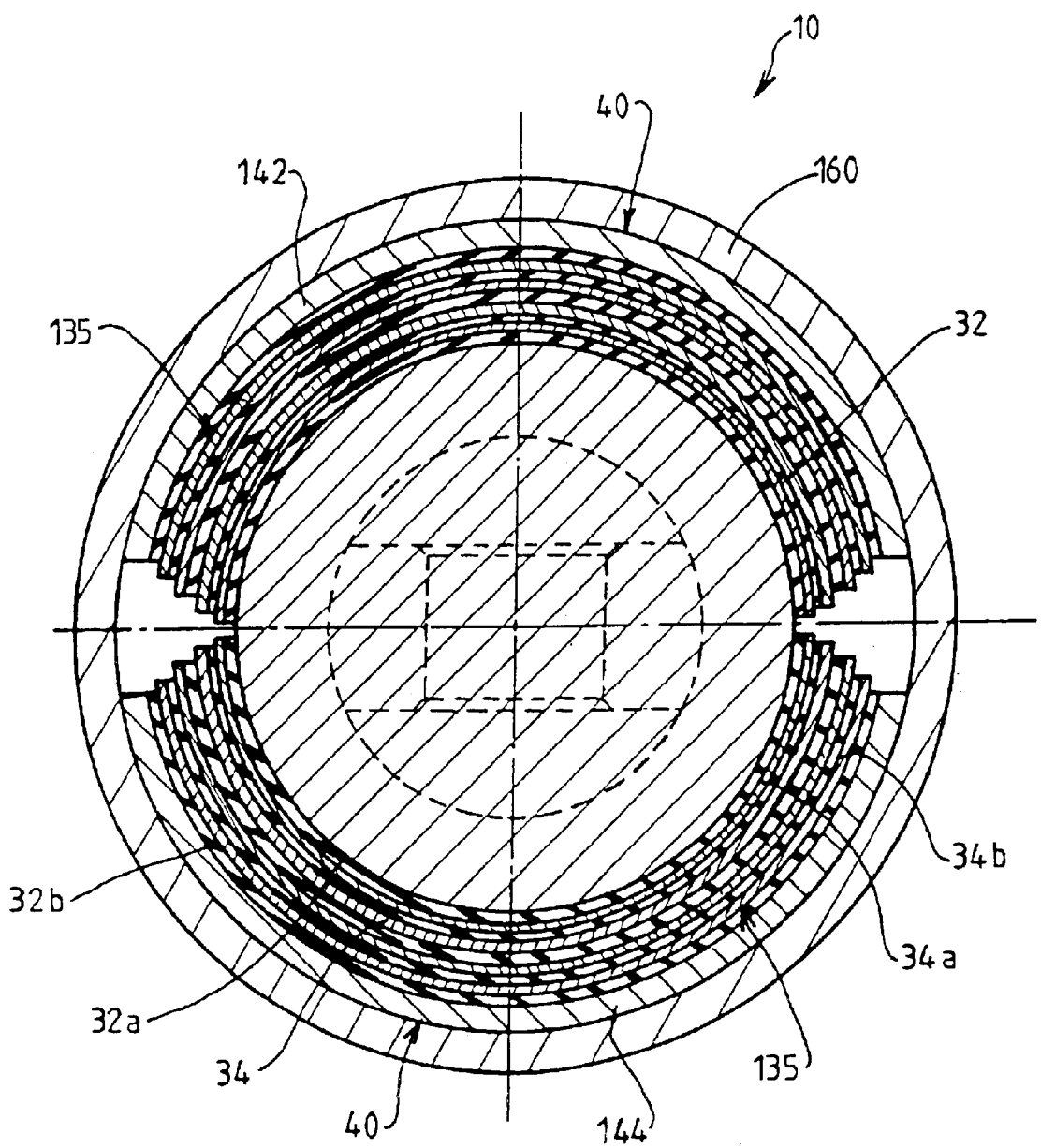
FIG. 6 is a sectional view of FIG. 5.

FIGS. 5 and 6 depict an alternative form of embodiment in which the ball joint 10 comprises two laminated structures 135 each consisting of a stack of layers 32 of elastic material, such as natural rubber, and of layers 34 of a more rigid material, such as a metal (conventional steel). These laminated structures 135 in the form of half shells with a joining plane passing through the axis xx' of the support 20, are surrounded by half sleeve tubes 142 and 144 with the same plane of section, these half sleeve tubes acting as means 40 for preloading the laminated structures Thus, in contrast with the previous embodiment, the half shells and the half sleeve tubes are therefore not annular and no longer meet on a plane perpendicular to the axis xx' but on a plane passing through this axis xx', as can be seen in FIG. 6. The half shells (and the two half sleeve tubes) therefore extend along the axis xx', each matching half the spherical shape of the core 50 support 20 over which the laminated structure is molded.

The way in which this elastically deformable member 30 is produced is similar to that of the previous embodiment, except that the complete ball joint is made in a single shot by molding the rubber between the cups 34, the half sleeve tubes 142 and 144 and the core 50. Preloading (mainly radial) is exerted at the time of this molding by the half sleeve tubes 142 and 144 on the laminated structures.

An external tube 160 may also be crimped around the sleeve tubes to hold the assembly in place and provide the preload, although this is not necessary, it being possible for this preload to be provided by assembly.

The properties obtained with this type of ball joint are approximately equivalent to those of the first embodiment, except that the first ball joint has the same radial and conical stiffness regardless of the direction in which the radial force or conical moment is applied. It must of course however be understood that these examples are given purely by way of illustration of the subject of the invention, which they do not in any way restrict.

Thus, this type of ball joint may find a use outside the field of anti-roll bars, for example in the field of attachments for dampers, draught arms, braking mechanisms, couplings, controls for pneumatic devices or guide mechanisms. Nor is the ball joint according to the invention restricted to use in the rail field; it may be applied to the aeronautical or automobile industry.

Furthermore, the spherical shape of the core 50 may be machined directly on the support, without having to resort to an intermediate component.

Of course the number and thickness of the layers can vary according to the required characteristics (radial, torsional and conical torsional stiffness) and levels of deflection and load desired for these three types of stressing. The result, in terms of layer thicknesses mainly, is a compromise between the radial stiffness, on the one hand, and the torsional and conical stiffness, on the other, and the forces and angles to which the ball joint is subjected (maximum values and fatigue value).

The flexible layers may be made of natural rubber or of any other material with hyperelasticity properties.

Finally, the welding of the sleeve tubes may be replaced by a fixing using several screws which is arranged on lugs of each sleeve tube, by crimping, or by any other equivalent means.

What is claimed is:

1. Connecting ball joint (10), for an anti-roll bar of a running vehicle, said ball joint (10) comprising a straight support (20) running along a general axis of elongation (xx') and an elastically deformable member (30) mounted around the support (20), said elastically deformable member (30) comprising two laminated structures (135) made up of layers (32; 32a; 32b) of elastically deformable flexible material and layers (34; 34a; 34b) of more rigid material and means (40) for preloading said laminated structures (135), characterized in that the elastically deformable member (30) has a plane of section passing through the axis (xx') of the support and dividing the two approximately hemispherical laminated structures (135) extending along the axis (xx') and two half sleeve tubes (142, 144), also approximately hemispherical, each surrounding one of the laminated structures (135) to preload their elastically deformable layers (32; 32a; 32b).

2. Ball joint (10) according to claim 1, characterized in that an outer tube (160) is crimped around the half sleeve tubes (142, 144).

* * * * *